United States Patent
Najari et al.

(10) Patent No.: US 9,753,684 B1
(45) Date of Patent: Sep. 5, 2017

(54) PRINTER LOCATION AWARE DETECTION AND PRINTING

(71) Applicant: Seiko Epson Corporation, Tokyo (JP)

(72) Inventors: Amir Najari, Maple (CA); Christopher Wu, Oakville (CA); Gerhard Bork, Schomberg (CA)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/064,842

(22) Filed: Mar. 9, 2016

(51) Int. Cl.
*G06F 3/12* (2006.01)
*G07G 5/00* (2006.01)

(52) U.S. Cl.
CPC .......... *G06F 3/1272* (2013.01); *G06F 3/1204* (2013.01); *G06F 3/1232* (2013.01); *G06F 3/1236* (2013.01); *G06F 3/1292* (2013.01); *G07G 5/00* (2013.01)

(58) Field of Classification Search
USPC ........................................ 358/1.15
See application file for complete search history.

(56) References Cited

U.S. PATENT DOCUMENTS

| | | | |
|---|---|---|---|
| 2005/0128968 A1* | 6/2005 | Yang | H04W 48/16 370/312 |
| 2013/0208312 A1* | 8/2013 | Morita | G06F 3/04883 358/1.15 |
| 2014/0058864 A1 | 2/2014 | Sugiyama | |

FOREIGN PATENT DOCUMENTS

| | | |
|---|---|---|
| JP | 2013-246785 A | 12/2013 |
| WO | 2012/118045 A1 | 9/2012 |

OTHER PUBLICATIONS

Suzuki Kengo, Portable Settlement Terminal Device and Print Instruction Method, Sep. 12, 2013, Machine Translated Japanese Patent Application Publication, JP2013-246785 listed on IDS, All Pages.*

* cited by examiner

*Primary Examiner* — Ngon Nguyen
(74) *Attorney, Agent, or Firm* — Foley & Lardner LLP (57) ABSTRACT

A method for identifying a printer and printing is provided. The method includes transmitting, from each of a plurality of printers, a wireless beacon. The method includes receiving, at a printer, an instruction from a mobile device to print information, wherein the instruction is received via a wireless network, the mobile device determining, based on radio signal strength of wireless beacons, which of the plurality of printers is closest to the mobile device and selecting and coupling to the printer via the wireless network to send the instruction to the printer. The method includes printing, at the printer selected by the mobile device, the information in accordance with the instruction.

20 Claims, 10 Drawing Sheets

PRINTER LOCATION AWARE DETECTION AND PRINTING

BACKGROUND

Printers and other electronic devices increasingly have wireless connectivity capability. User devices, including mobile devices and personal computers, often can connect wirelessly to a cell phone network or to Wi-Fi™ (wireless fidelity) or generic IEEE 802.11, and through these networks can connect to printers or further devices. Using such connectivity, a user device can print a document, or access a printer to look at ink levels. Yet, there is so much more that wireless connectivity can do, for example to enhance retail and electronic product installation experiences for shoppers. Recently, a capability to transmit a wireless beacon (e.g., using an advertising packet such as iBeacon™, the open source Eddystone™, generic IEEE 802.11 or Bluetooth™ with a universally unique identifier for each device) has been added to some wireless devices. This opens up further possibilities for connectivity and communication. It is in this context that the present embodiments arise.

SUMMARY

In some embodiments, a method for identifying a printer and printing is provided. The method includes transmitting, from each of a plurality of printers, a wireless beacon. The method includes receiving, at a printer, an instruction from a mobile device to print information, wherein the instruction is received via a wireless network, the mobile device determining, based on radio signal strength of wireless beacons, which of the plurality of printers is closest to the mobile device and selecting and coupling to the printer via the wireless network to send the instruction to the printer. The method includes printing, at the printer selected by the mobile device, the information in accordance with the instruction.

In some embodiments, a tangible, non-transitory, computer-readable media having instructions thereupon which, when executed by a processor, cause the processor to perform a method is provided. The method performed by the processor includes transmitting, from a printer that includes the processor, a wireless beacon. The method includes coupling the printer and a mobile device via a wireless network coupling, responsive to the mobile device determining which of a plurality of printers is a closest printer to the mobile device, based on radio signal strength of wireless beacons, and wherein the mobile device selects the printer as the closest printer. The method includes receiving from the mobile device, via the wireless network coupling, an instruction to print information and printing the information, as instructed by the mobile device.

In some embodiments, a system with printer location aware detection and printing is provided. The system includes a printer having wireless connectivity and a wireless beacon. The printer is configured to couple, using the wireless connectivity, to a mobile device responsive to the mobile device determining, based on radio signal strength of wireless beacons, that the printer is a closest printer, of a plurality of printers, to the mobile device. The printer is configured to receive, via the wireless connectivity, from the mobile device, information to print, and print the information.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

With increased availability of wireless connectivity, many devices that would ordinarily require wired connection and fixed location can be coupled wirelessly at the convenience of the devices and users. Such connectivity opens up new possibilities for user experiences and operations of the devices. User devices with wireless connectivity, especially mobile ones such as cell phones, personal digital assistants, tablets and portable computers, can interact with printers that have wireless connectivity. Printers, usually thought of as having only the singular role of printing as instructed by a computing or communication device, and informing those devices of the service needs of the printer such as for ink refills, can take on new, unexpected roles, as described in the following systems and scenarios. Although a printer 104 is depicted in these scenarios, use of other equipment (e.g., electronic devices with wireless connectivity capability) in various related scenarios is readily envisioned by the person of skill of in the art, in light of the teachings described herein. Also, various related scenarios are readily envisioned in which wired connections, wired networks or combinations of wired and wireless connections and networks are used (e.g., a PC wired to a network, a printer wired to a network, a mobile device or a personal computer coupled wirelessly to a wired network by a cellular gateway or wireless router, etc.)

Figure 1:
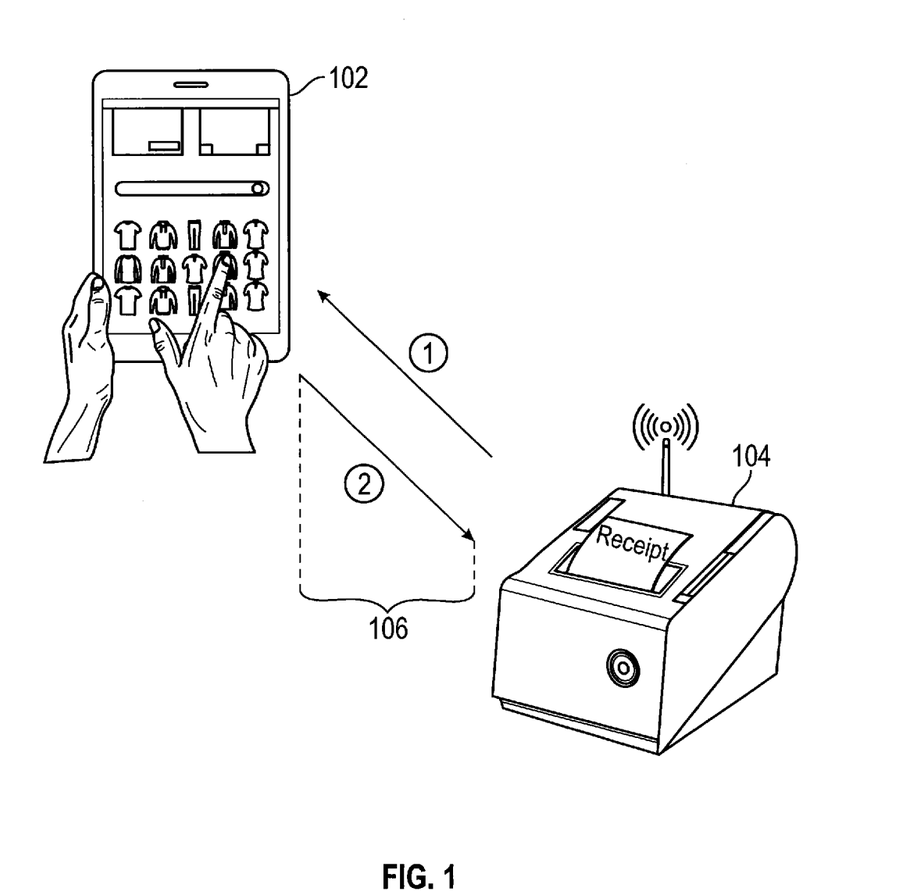
FIG. 1 depicts a mobile device and a printer coupled by a wireless connection and communicating with each other, as used in various embodiments described herein.

FIG. 1 depicts a mobile device 102 (or other device or computer capable of wireless use) and a printer 104 coupled by a wireless connection 106 and communicating with each other, as used in various embodiments described herein. The wireless connection 106 can be initiated and set up through one of many protocols, and could be, for example a Bluetooth™ connection or a Wi-Fi™ (wireless fidelity) connection. The connection could be accomplished with discovery, or direct connection request. The devices could use pairing and bonding, but this is not required. In one version of this scenario, the printer 104 transmits a beacon (e.g., using the iBeacon™ Eddystone™, or generic IEEE 802.11 protocol or Bluetooth™ wireless connectivity capability), which the mobile device 102 detects. Generally, the beacon includes information about where to find the printer, for printing, e.g. an IP (Internet protocol) address, a Bluetooth™ address or a printer ID (identifier) for lookup. The mobile device 102 then requests connectivity, for example using a network identity of the printer as broadcast in the wireless beacon, and couples wirelessly directly to the printer 104. Once coupled, the mobile device 102 and the printer 104 can communicate via the wireless connection 106. This acts as a single, direct leg of a wireless network connection. It should be appreciated that while a mobile device 102 is illustrated in the embodiments described herein, the embodiments are not limited to this configuration. For example, in some embodiments, a beacon receiver can be installed onto a standard personal computer (PC) that has a wired connection to the network, as in a traditional point of service (POS) setup. The PC can monitor for advertising beacons and then select the closest printer. In this embodiment, the POS system does not need to be configured with a single printer and because the printer is connected to the network, the printer can be used by multiple hosts.

Figure 2:
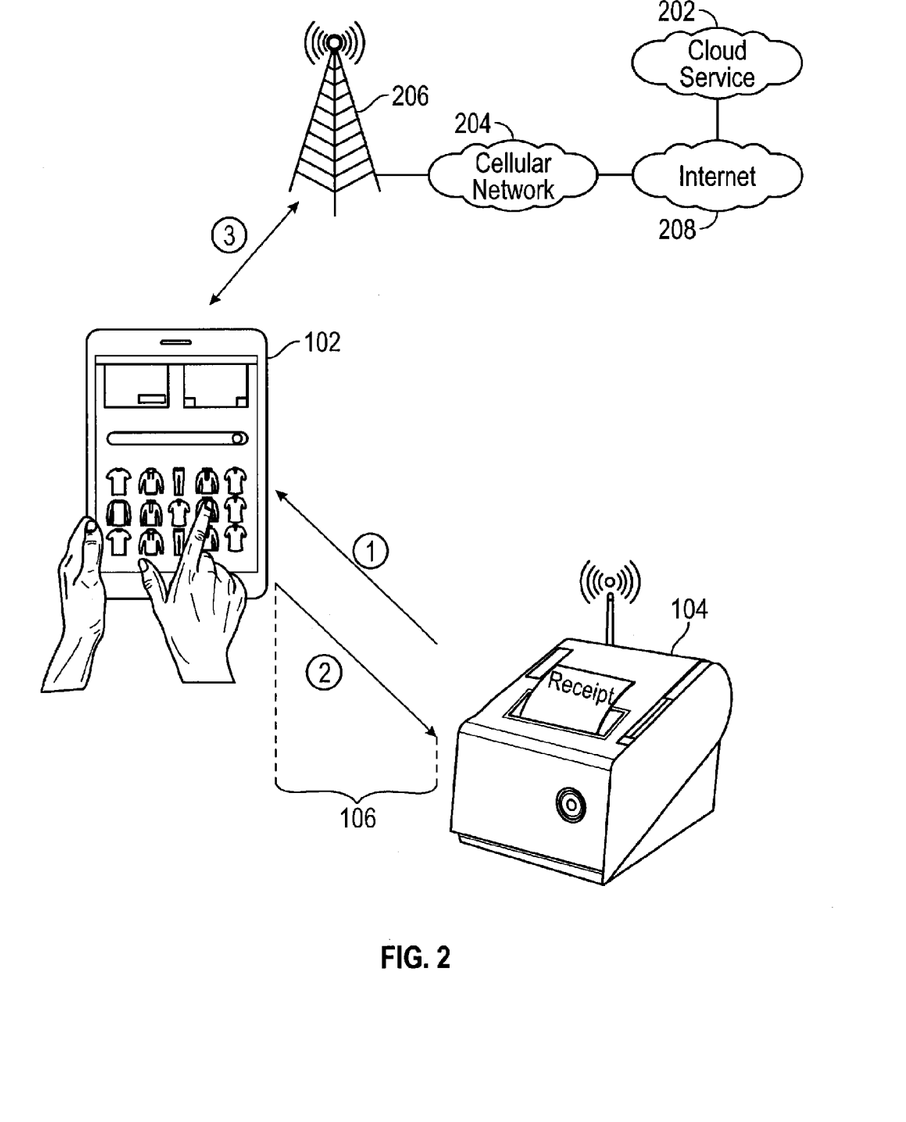
FIG. 2 depicts the mobile device communicating with a cloud service via a cellular network, with the mobile device coupled to the printer via the wireless connection shown in FIG. 1 in accordance with some embodiments.

FIG. 2 depicts the mobile device 102 communicating with a cloud service 202 via a cellular network 204, with the mobile device 102 coupled to the printer 104 via the wireless connection 106 shown in FIG. 1. In this scenario, the mobile device 102 couples to the cellular network 204 via a cellular tower 206, and the cellular network 204 couples to the cloud service 202 through a gateway and various switches, routers, etc., of the cloud 208 (e.g, the global communication network known as the Internet). The cloud service 202 could be any source or destination of information in the cloud 208, for example at an Internet website. Particular cloud services 202 are further discussed below in the context of some of the scenarios.

Figure 3:
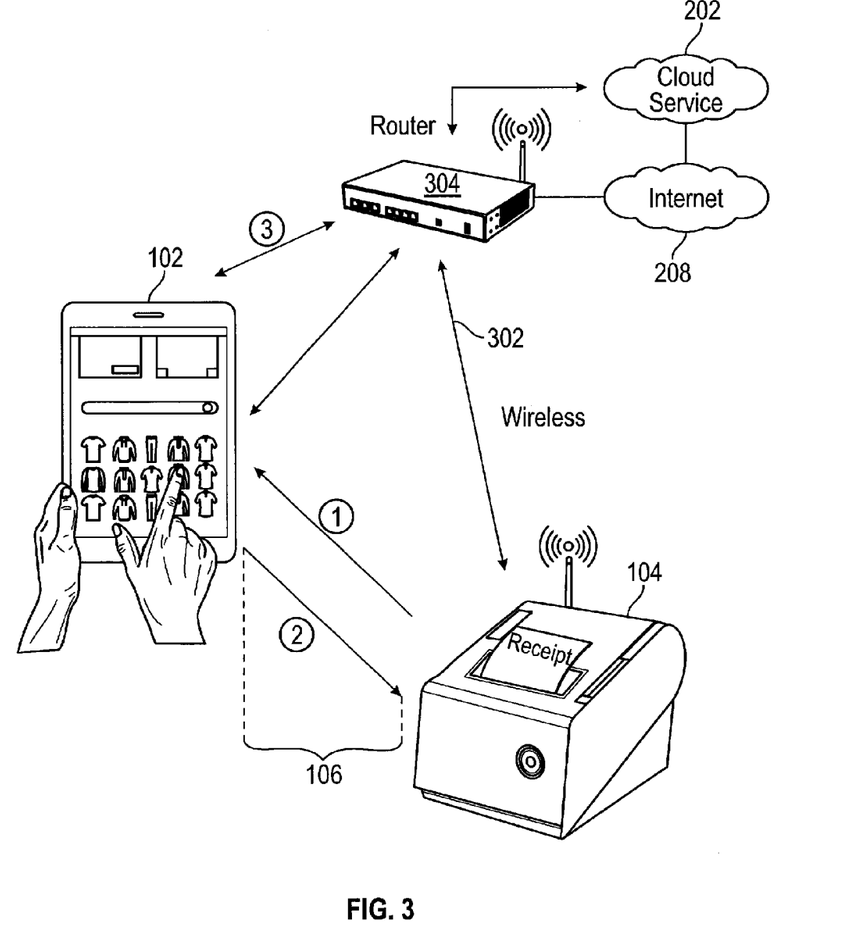
FIG. 3 depicts the mobile device communicating with a cloud service via a Wi-Fi™ network hosted by a wireless router, with the mobile device coupled to the printer via either the wireless connection shown in FIG. 1 or via the Wi-Fi™ network in accordance with some embodiments.

FIG. 3 depicts the mobile device 102 communicating with a cloud service 202 via a Wi-Fi™ network 302 hosted by a wireless router 304, with the mobile device 102 coupled to the printer 104 via either the wireless connection 106 shown in FIG. 1 or via the Wi-Fi™ network 302. The wireless router 304 couples to the cloud 208, so that the mobile device 102 couples to the cloud service 202 through the wireless router 304 and the cloud 208 (e.g., the Internet). In the first of two variations, the mobile device 102 couples directly to the printer 104 via the wireless connection 106, e.g., a Bluetooth™ direct wireless connection. In the second of the two variations, the mobile device 102 couples to the wireless router 304 via the Wi-Fi™ network 302 and the printer 104 couples to the wireless router 304 via the Wi-Fi™ network 302. The mobile device 102 can then couple to the printer 104, for example using the network identity of the printer 104, through the wireless router 304. Communication between the mobile device 102 and the cloud service 202, and between the mobile device 102 and the printer 104, are supported in these connections and variations thereof. In one variation, the printer 104 is connected via a wired network connection to the wireless router 304. The mobile device 102 can still couple to the printer 104 via the wireless network supported by the wireless router 304.

Figure 4:
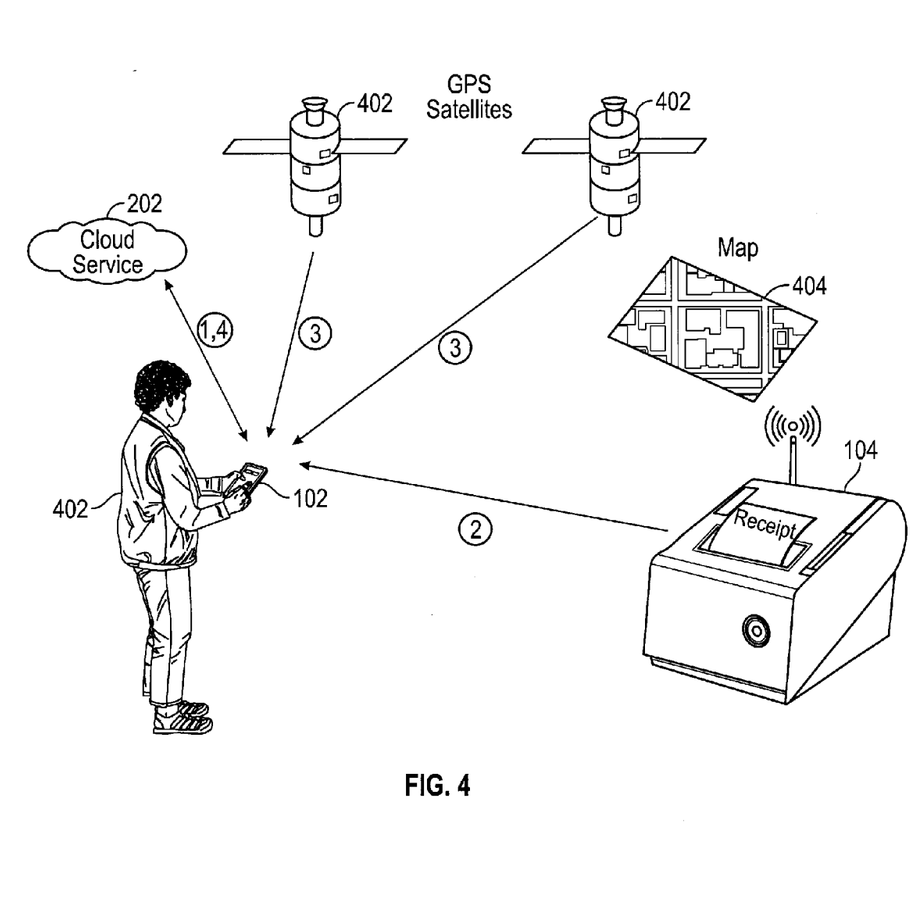
FIG. 4 is a system and scenario diagram, showing an installer using a mobile device to register and activate a printer in accordance with some embodiments.

FIG. 4 is a system and scenario diagram, showing an installer 402 using a mobile device 102 to register and activate a printer 104. This scenario involves registering and activating equipment, such as printers 104, so that an end user can access services from a cloud service 202 that supports the registered equipment. Registration of a printer 104 or other electronic equipment usually involves a user logging onto a cloud service 202, for example logging onto a website of a manufacturer, and entering information such as the serial number of the printer 104, retailer name, geographical location of the printer 104, etc. Registration could also include programming a unique number to the printer for use with a beacon that is installed on the printer, if this unique number has not been programmed at the factory. In the scenario of FIG. 4, registration is performed using a mobile device 102 coupled to the printer 104 and also coupled to the relevant cloud service 202. These couplings could use any of the arrangements, sequences and connection techniques shown in FIGS. 2 and 3, or variations thereof. FIG. 4 shows a sequence of four actions, each of which could involve multiple activities as part of the action, to register and activate a printer 104. A related method is described below with reference to FIG. 7.

In a first action of FIG. 4, an installer 402 (e.g., a user, who could be an employee or service provider, or an owner of the printer 104) uses a mobile device 102 to register and activate the printer 104 on a cloud service 202 associated with the manufacturer or vendor of the printer 104. This could involve navigating to the cloud service 202 on a user interface of the mobile device 102, setting or using a user ID and password, and selecting product registration (e.g., before or after logging on).

In a second action of FIG. 4, the mobile device 102 uses a wireless connection (e.g., Bluetooth™ LE or low energy using the generic attribute profile or GATT services of the printer 104) to communicate with the printer 104 to obtain information such as the serial number of the printer 104. There are many ways in which this communication could occur. The mobile device 102 could be equipped with an application (App) that requests the printer 104 send information back to the mobile device 102. Or, the printer 104 could be programmed to offer this information when coupled to a mobile device 102. Information could be put in a beacon transmitted by the printer 104, which the mobile device 102 could detect. The information sent by the printer 104 to the mobile device 102 could include the serial number, or another identifier of the printer 104, and/or a model number, name, date of manufacture, manufacturer name, software revision number, health status, etc.

In a third action of FIG. 4, GPS (global positioning system) coordinates and/or an address or other geolocation information (symbolized by the map 404) is used to determine the geolocation of the printer. In various embodiments, the geolocation information comes from the mobile device 102 rather than from the printer 104 itself. Many mobile devices 102 have a GPS receiver, and by using this component and associated capability, a mobile device 102 can provide GPS coordinates and send them to the cloud service 202 during the registration process. This activity could be performed automatically by an application, using information from GPS satellites 402 and the GPS receiver of the mobile device 102, without manual entry of geolocation information. Or, a user could enter an address into a user interface on the mobile device 102, and the mobile device 102 could send this to the cloud service 202. Alternatively, the mobile device 102 could send a home address or company address where the printer will be installed, to the cloud service 202. The home address or company address could be obtained from an address listing in the mobile device 102, or manually entered. Other geolocation options include determining location by cell tower location or Wi-Fi™ router location, and further geolocation options are readily devised and applied in keeping with the teachings herein.

In a fourth action of FIG. 4, information about the printer, serial number, geolocation, retailer, etc. is registered with the cloud service 202. After the mobile device 102 sends the printer serial number or other identification information, obtained from the printer 104, and the geolocation information obtained from the mobile device 102, plus any further information such as the retailer name and location (e.g., entered manually into the mobile device 102) to the cloud service 202, the cloud service 202 associates all of this information with the printer and registers the printer. For example, all of this information could be kept on a server, saved in a database, or sent to another site. In a further embodiment, the mobile device 102 sends configuration information to the printer 104 and/or the cloud service 202 sends configuration information to the printer 104 via the mobile device 102, so that the printer 104 becomes configured. The configuring information could include updates to software, calibration, a sample print page, etc. In some embodiments, the configuration information includes the unique number as an identifier of the printer and/or a message, either or both of which the printer then uses in the beacon, as described above.

Figure 6:
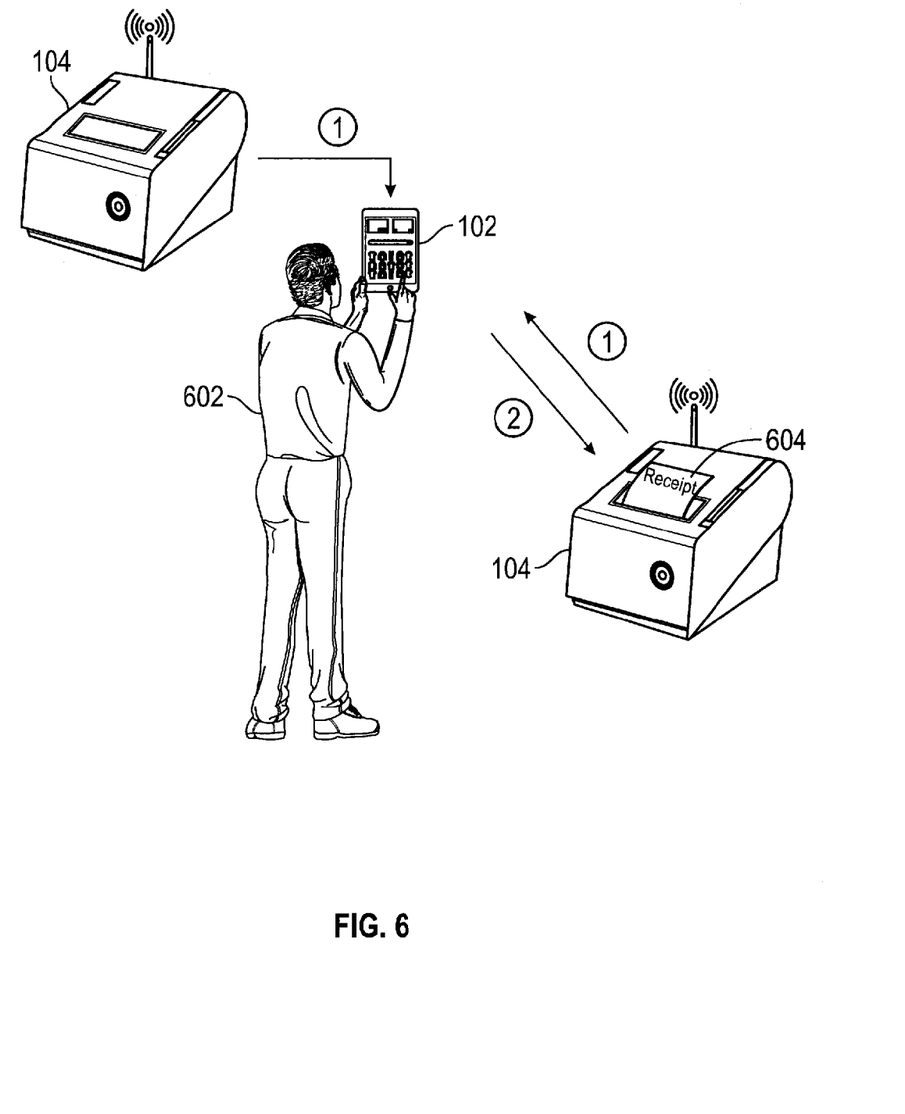
FIG. 6 is a system and scenario diagram, showing a sales associate with a mobile device that prints a receipt at the closest printer in accordance with some embodiments.
Figure 7:
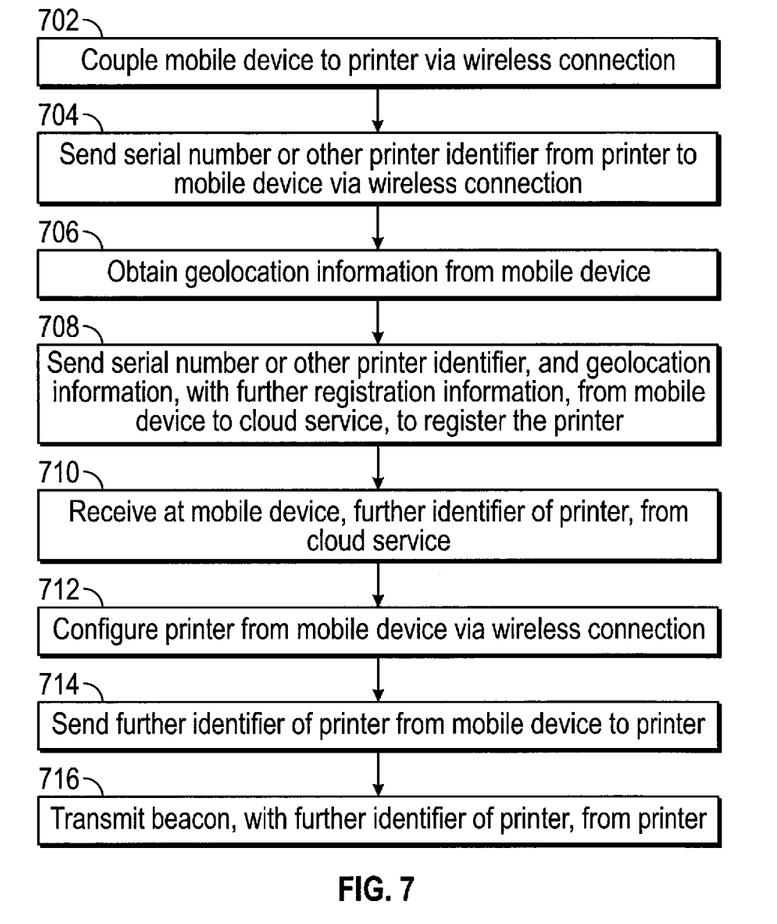
FIG. 7 is a flow diagram of a method for configuration of equipment, which can be practiced in the system and scenario of FIG. 4 in accordance with some embodiments.

The end-user can then enable some services, for example based on location. Two such scenarios are illustrated in FIGS. 6 and 7. One advantage of the above-described registration method is that the printer 104 or other electronic equipment does not need to be connected to the cloud 208 and the cloud service 202 (except indirectly through the mobile device 102). The mobile device 202 acts as an intermediary between the printer 104 and the cloud service 202. Another advantage is that this process can be automated so that the installer does not need to manually type in the printer serial number or other information obtained directly from the printer 104 or the mobile device 102, so mistakes are greatly decreased or eliminated.

Figure 5:
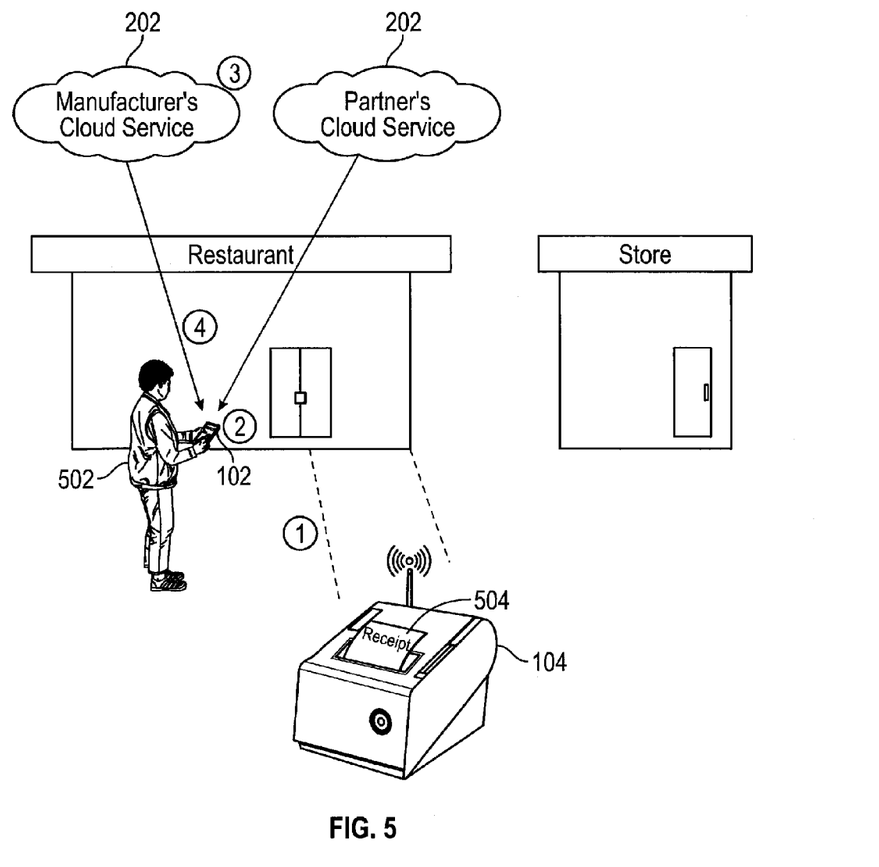
FIG. 5 is a system and scenario diagram, showing a user with a mobile device that detects a beacon from the printer, and obtains location aware information of use to a shopper in accordance with some embodiments.

FIG. 5 is a system and scenario diagram, showing a user 502 with a mobile device 102 that detects a beacon from the printer 104, and obtains location aware information of use to a shopper (e.g., user 502). Location aware information is defined as information that exhibits an awareness of location, e.g., of a user, a place (business, building or dwelling), or a device or other equipment such as a cell tower or a Wi-Fi™ router. User location or user location awareness is of interest to many service providers. In the FIG. 5 scenario, the printer 104 can create a beacon, and further printers 104 can create a beacon network, which can be used to identify the location of the shopper. Once a printer 104 has been registered with a location of the printer 104, the printer 104 can start transmitting an advertising beacon (e.g., using iBeacon™) that identifies the printer with a unique printer ID (identifier).

One or more cloud services 202, such as for cloud partners of the manufacturer of the printer, can use the information about location of a shopper in an application to determine what store a shopper is in or near, and then provide to the shopper some location aware information. Two advantages of having a beacon integrated into a printer 104 are that many printers have power on all the time, and the beacon does not need to have any interaction with the printer, only power. The printer 104 and beacon can be registered and/or configured manually, or through the arrangement and scenario depicted in FIG. 4, etc. FIG. 5 shows a sequence of four actions, each of which could involve multiple activities as part of the action, to provide location aware information, based on the location of the printer 104, to a mobile device 102 of a user. A related method is described below with reference to FIG. 8.

In a first action of FIG. 5, a printer 104 in a store, restaurant or other location sends out a beacon that can be detected by a mobile device 102. The beacon could include an advertising packet and/or a unique identifier. In this example, the beacon is transmitted using Bluetooth™ LE or low energy. In some embodiments, the beacon is based on a Bluetooth™ advertising packet.

In a second action of FIG. 5, as a user goes by the store or into the store, a mobile device 102 of the user detects the beacon packet and directs the user to open up an application (App). This could be in the form of displaying, on the mobile device, an option to open up an application. Alternatively, a user could download an application that monitors for the presence of beacons, and alerts the user or performs automated functions upon detection of a beacon. In both cases, the application communicates with the cloud service 202.

In a third action of FIG. 5, the beacon information is used to determine the location of the user. One main advantage is that this technique works inside a store or mall, where geolocation by GPS might not. Another advantage is that this technique works when a user has disabled GPS functionality of the mobile device 102, or disabled the mobile device 102 from transmitting GPS coordinates to others. The location of the user is determined by inference. To make this work, the physical location of the printer 104 should be registered with the cloud service 202, for example using the techniques described with reference to FIG. 4, or by manually registering the physical location of the printer 104 in association with the information that is broadcast in the beacon, identifying the printer 104. This registration could record the physical location of the printer 104 as GPS coordinates, an address, a name of a place such as a name of a particular store or department within a store, etc. Then, when a mobile device 102 (e.g., of a shopper) detects the beacon of the printer 104 and information identifying the printer 104, in the beacon, the mobile device 102 sends the information identifying the printer 104 to the cloud service 202. This can be accomplished via the cellular network 204, as shown in FIG. 2, or via a Wi-Fi™ network 302, as shown in FIG. 3, using the application that the user opens up or has already running on the mobile device 102, as described in the second action of FIG. 5. This process could be automated or manually directed, in variations. Since the mobile device 102 is within a beacon-detection vicinity of the printer 104, the cloud service 202 infers that the physical location of the mobile device 102 is approximately that of the printer 104. And, the cloud service 202 can look up the physical location of the printer 104, since that information has been registered in association with the information identifying the printer 104, to the cloud service 202, or shared to the cloud service 202 from another cloud service 202 or source in which the registration has taken place. That is, the cloud service 202 determines the location of the mobile device 102 as within a beacon-detection vicinity of the printer 104 associated with the information identifying the printer 104. By associating the registered physical location of the printer 104, the information identifying the printer 104, the mobile device 102 within the vicinity of the printer 104, and the user as operator of the mobile device 102, the cloud service 202 infers the physical location of the user. This happens without using GPS or location information of the mobile device 102 itself.

In a fourth action of FIG. 5, a partner service, for example the cloud service 202 that infers the physical location of the user, or another cloud service 202 provides location aware information to the user. By location aware information, it is meant that the information relates to the location, in this case the location of the user, the mobile device 102 and the printer 104. So, for example, the location aware information that the cloud service 202 sends to the mobile device 104 could include a coupon valid at a store that has the printer inside, or an advertisement, message or announcement about a store, product or service available nearby to where the printer 104 is located. In the specific example where the printer 104 is located in or near a restaurant, the location aware information could be a menu of the restaurant or food specials of the day, etc. The location aware information could include an offer to print a coupon 504, purchase order or product or service information. Upon receiving such, the mobile device 104 could display this offer on a user interface of the mobile device 104. If the user selects a symbol to print the coupon 504, purchase order, or product or service information, the mobile device 104 then communicates an instruction to do so to the printer 104 whose beacon was detected by the mobile device 104. The printer 104 prints the coupon 504, purchase order or product or service information accordingly. In a variation, if there are multiple printers available, the mobile device 104 selects the nearest printer and sends the printing instruction to that printer, using techniques described below with reference to FIG. 6.

FIG. 6 is a system and scenario diagram, showing a sales associate 602 with a mobile device 102 that prints a receipt 604 at the closest printer 104. In the retail world, more and more mobile devices 102 such as iPads™, iPhones™ and various tablets are being used by the retailer to enhance the retail experience for the shopper. In order to provide a seamless experience, the sales associate 602 can put in an order for the customer, and have the customer pay using the tablet or other mobile device 102. In the scenario of FIG. 6, the sales associate 602 can print the receipt 604 over Wi-Fi™ or Bluetooth™ at the nearest printer 104, or walk over to one of several or many printers and print at that printer 104, without manually selecting and connecting with that printer 104. The printer 104, or each of several printers 104, is equipped with a beacon (e.g., using iBeacon™) that can be used to transmit information about the network identity of the printer 104. This information can be detected by mobile devices 102 and computers to determine, by radio signal strength, which printer 104 is the closest. FIG. 6 shows a sequence of two actions, each of which could involve multiple activities as part of the action, to automatically select the nearest printer 104 and print with that printer 104. A related method is described below with reference to FIG. 9.

In a first action of FIG. 6, a mobile device 102 such as a tablet detects beacons from different printers 104. For example, the mobile device 102 could have an application that looks for beacons either full-time or when about to print a receipt 604. Each beacon should have a unique identifier for that specific printer 104, so that the mobile device 102 can distinguish amongst the printers 104.

In a second action of FIG. 6 the mobile device 102 (e.g., the tablet) chooses the closest printer 104 to print the receipt 604. To do so, the mobile device 102 could make use of the received signal strength indicator (RSSI) capability of the mobile device, which measures the signal strength of a received radio signal such as the beacon of a printer 104. It should be appreciated that individual printers 104 or other electronic devices may have variations in transmitted signal power, due to manufacturing variations, model variations, design differences, component aging, component placement, etc., and other nearby structures can absorb, reflect or modify signal strength. Some devices, for example using AppleTalk™, have a calibration mechanism, and information compensating for one or more of these factors is added into the beacon information.

Nonetheless, despite all of these factors and with or without calibration, the received signal strength provides a good approximation of proximity of the printer 104 or other electronic device to the receiver of the signal, i.e., the mobile device 102 in this example. By comparing received signal strengths of multiple beacons, the mobile device 102 can determine which received signal strength is greatest, and determine to which beacon and printer 104 this greatest received signal strength corresponds. Each beacon should have identifying information, so that the mobile device 102 can identify the printer 104 that is associated with the beacon that has the greatest received signal strength. Once this is determined, the mobile device 102 selects the printer 104 with greatest received signal strength at the mobile device 102 as the closest printer 104. Then, the mobile device 102 couples to that printer 104 through a direct wireless connection (as depicted in FIGS. 1 and 2 and in one option in FIG. 3) or through a wireless router (as depicted in another option in FIG. 3), if the mobile device 102 has not already done so. If there is only one printer 104 within beacon-detection range of the mobile device 102, the mobile device 102 selects that printer 104 as the closest printer. In some embodiments, the mobile device 102 couples to the various printers 104 on an ongoing basis (e.g., whenever in wireless coupling range or whenever a printer 104 is online), and selects the closest printer 104 for each print request or group of print requests.

After selecting the closest printer 104, the mobile device 102 sends an instruction via the wireless coupling (e.g., Bluetooth™ or Wi-Fi™) to that printer 104 to print the receipt 604 or other relevant document or information. The selected printer 104 prints the receipt 604 or other document or information, according to the instruction. This is accomplished automatically by the mobile device 102 and printer(s) 104, i.e., without manually selecting the printer 104 and connecting the mobile device 102 with the printer 104. Further embodiments, for other situations and for printing other types of documents or information, or for other types of electronic devices, are readily devised in accordance with the teachings herein.

FIG. 7 is a flow diagram of a method for configuration of equipment, which can be practiced in the system and scenario of FIG. 4. Especially, the method can be practiced by processors of mobile devices and printers or other electronic devices.

In an action 702, a mobile device is coupled to a printer via a wireless connection. In an action 704, the serial number of the printer, or other printer identifier, is sent from the printer to the mobile device via the wireless connection. This could be upon request from the mobile device, or could be sent out by the printer without such a request, in various embodiments. In variations, the information is sent from the printer to the mobile device, or to another device such as a personal computer, through a wired connection such as a wired network. In an action 706, geolocation information is obtained from the mobile device. For example, an application on the mobile device could use the GPS capability of the mobile device to obtain GPS coordinates, without manual entry. Or, a user could manually enter an address or other geolocation information to the mobile device, for example when prompted.

In an action 708, the serial number or other printer identifier, and geolocation information, with any further registration information, is sent from the mobile device to a cloud service, to register the printer. This action is performed using mobile device connectivity to the Internet or other network coupled to the cloud service. In an action 710, the mobile device receives a further identifier of the printer, from the cloud service. In an action 712, the mobile device configures the printer via the wireless connection to the printer.

In an action 714, the further identifier of the printer is sent from the mobile device to the printer. In an action 716, the printer transmits a beacon, with the further identifier of the printer as obtained from the cloud service via the mobile device. These actions 714, 716 are performed in some versions of this method, and optional or not performed in other versions of this method.

Figure 8:
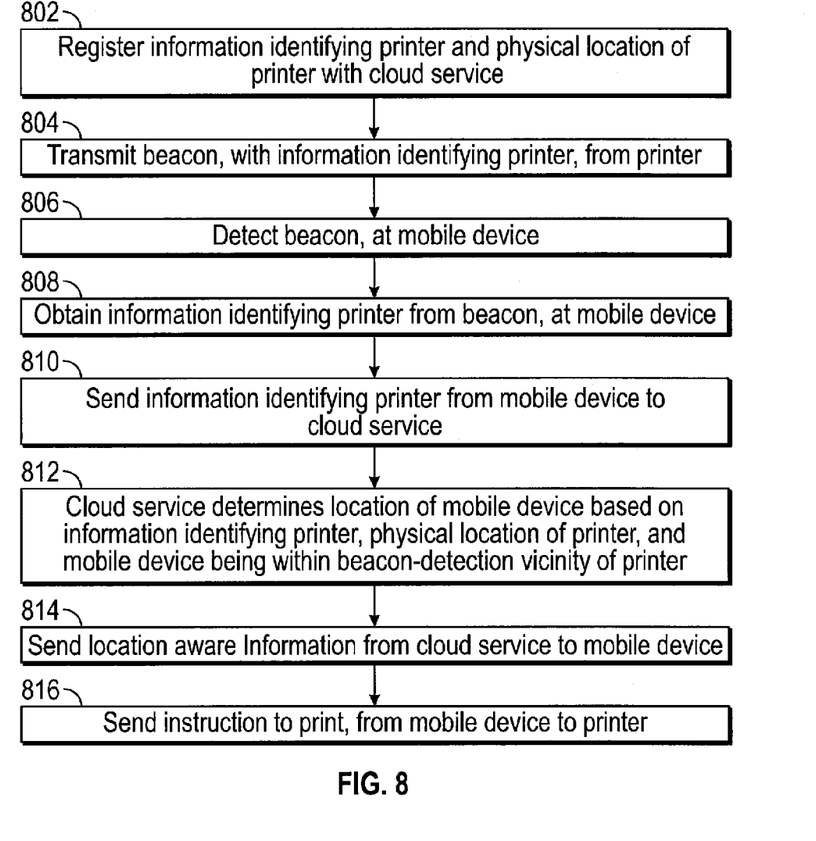
FIG. 8 is a flow diagram of a method of identifying shopper locations and providing enhanced shopper services, which can be practiced in the system and scenario of FIG. 5 in accordance with some embodiments.

FIG. 8 is a flow diagram of a method of identifying shopper locations and providing enhanced shopper services, which can be practiced in the system and scenario of FIG. 5. The method can be practiced by processors of mobile devices and printers or other electronic devices.

In an action 802, information identifying a printer and the physical location of the printer are registered with a cloud service. In an action 804, a beacon is transmitted, with the information identifying the printer, from the printer. In an action 806, the beacon is detected, at a mobile device. The mobile device obtains information identifying the printer, from the beacon, in an action 808, and sends the information identifying the printer to the cloud service in an action 810.

In an action 812, the cloud service determines the location of the mobile device, based on the information identifying the printer (as received from the mobile device), the physical location of the printer (as earlier registered in association with the information identifying the printer), and the mobile device being within a beacon-detection vicinity of the printer. That is, the cloud service infers that the mobile device is close enough to the printer to detect the beacon and send the information identifying the printer, so that the mobile device is approximately at the physical location of the printer, which the cloud service looks up from the registration of the printer. In an action 814, the cloud service sends location aware information to the mobile device. Since the cloud service has inferred the location of the mobile device, the location aware information can be tailored to suit that location, and could include information about a store, product, service or special offer available in a store or service provider nearby to where the printer is located.

In an action 816, an instruction to print is sent from the mobile device to the printer. This could be in response to receiving the location aware information, for example if the location aware information includes a coupon or information about a product or service that the user wishes to print. The application that communicates the information identifying the printer to the cloud service could also have a user interface that offers to print selected information based on the location aware information.

Figure 9:
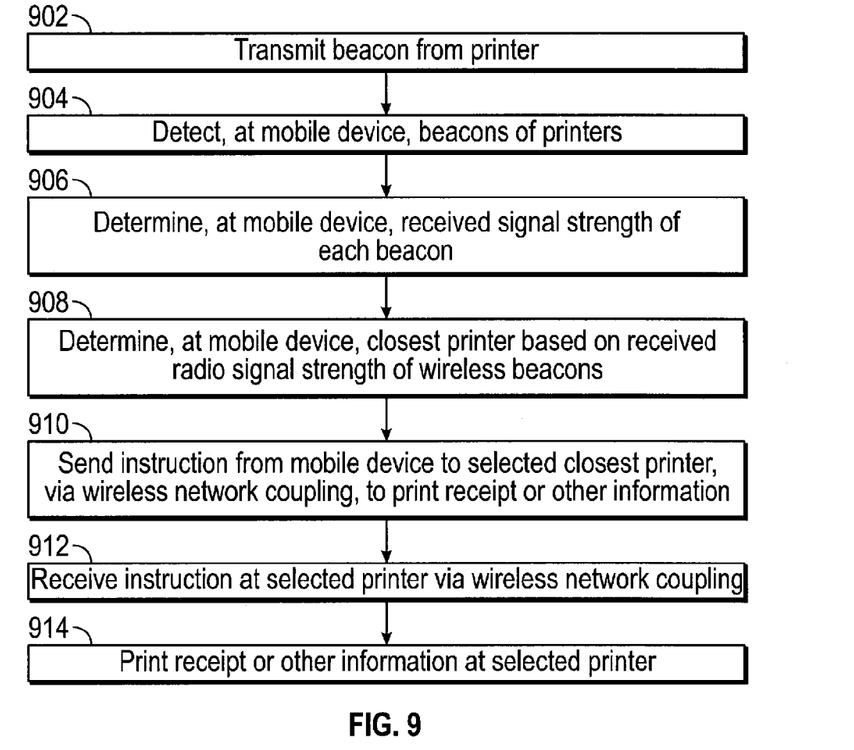
FIG. 9 is a flow diagram of a method of printer location aware detection and printing, which can be practiced in the system and scenario of FIG. 6 in accordance with some embodiments.

FIG. 9 is a flow diagram of a method of printer location aware detection and printing, which can be practiced in the system and scenario of FIG. 6. The method can be practiced by processors of mobile devices and printers or other electronic devices.

In an action 902, a beacon is transmitted from a printer. For example, the beacon can be a wireless beacon transmitted using iBeacon™ and Bluetooth™ as described with reference to FIG. 1. In an action 904, a mobile device detects beacons of printers. In an action 906, the mobile device determines the received signal strength of each beacon. This can be done using the RSSI capability of the mobile device, as described above with reference to FIG. 6.

In an action 908, the mobile device determines the closest printer based on the received signal strength of the wireless beacons. To do so, the mobile device determines the greatest received signal strength, and determines which beacon and printer correspond to this, as described with reference to FIG. 6. The mobile device selects the closest printer on this basis.

In an action 910, an instruction is sent from the mobile device to the selected closest printer, via a wireless network coupling, to print a receipt or other information. The wireless network coupling could be a direct wireless coupling of the mobile device and the printer, for example using Bluetooth™. Or, the wireless network coupling could be via Wi-Fi™, for example using a wireless router coupled to the mobile device and coupled to the printer.

In an action 912, the instruction to print is received at the selected printer via the wireless network coupling. In an action 914, the receipt or other information is printed at the selected printer.

It should be appreciated that the above described methods and scenarios, and actions and techniques described therein, could be combined in various ways in accordance with the teachings herein, with printer configuration and cooperation with one or more user devices. For example, a shopper could be attracted to a store, by a beacon and the location aware information delivered in the scenario of FIG. 5 and the method of FIG. 8. Once in the store, the shopper could be attracted to different locations within the store by other beacons. The shopper might want to print a coupon at the nearest printer, using a combination of techniques from the scenarios of FIGS. 5 and 6 and the methods of FIGS. 8 and 9. The shopper could then select a product or service, and a sales associate (or the shopper) could generate and print a receipt at the nearest printer, using the same or another mobile device and the techniques shown in FIGS. 6 and 9. If the product being purchased is a printer, registration and installation of the printer could be performed using the same or another mobile device and the techniques shown in FIG. 4 and the method of FIG. 7. In any of these scenarios, particularly the scenarios of FIGS. 5 and 6, the mobile device could have a visual indication, based on received signal strength, of whether the mobile device and user are getting closer to or farther from a printer that is a source of a beacon, or relative distance to the source of the beacon. This could be used to guide a shopper to a product or service area or guide a sales associate to the printer that was selected automatically by the mobile device for printing. The mobile device could also indicate which of several printers, for example by printer name or location, is the printer to which the instruction to print the receipt or other information was sent. This could be a visual indication. These two capabilities could be tied together, so that the mobile device indicates when the mobile device is getting closer to or farther away from the particular printer that the mobile device selected for printing. This would help the sales associate retrieve the receipt, in cases where there might be multiple printers relatively nearby and the sales associate is unsure which printer is printing the receipt. And, further scenarios and methods could be developed for other types of products that have beacons and wireless connectivity.

Figure 10:
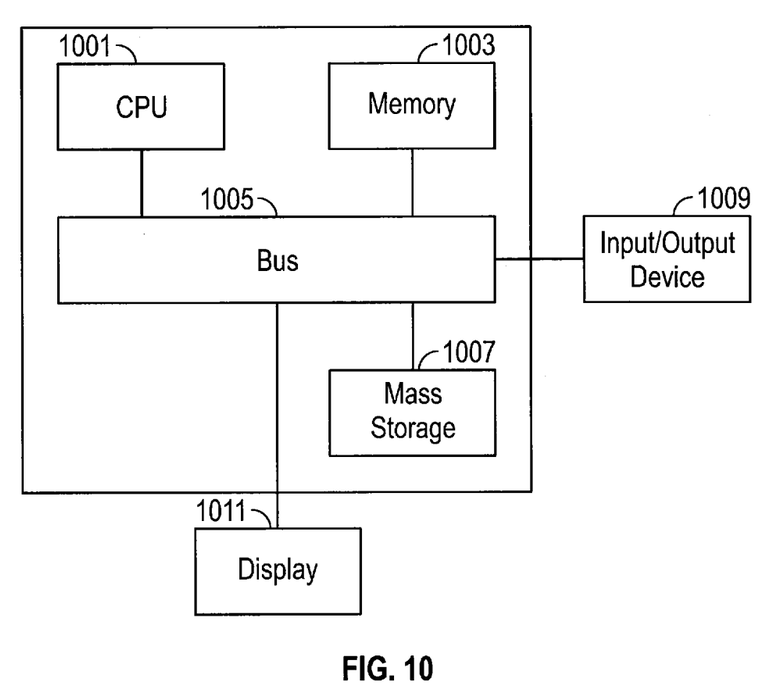
FIG. 10 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 10 is an illustration showing an exemplary computing device which may implement the embodiments described herein. The computing device of FIG. 10 may be used to perform embodiments of the functionality for the information entry, generation, association, retrieval and communication in accordance with some embodiments, and the printer could be used as a display. The computing device includes a central processing unit (CPU) 1001, which is coupled through a bus 1005 to a memory 1003, and mass storage device 1007. Mass storage device 1007 represents a persistent data storage device such as a floppy disc drive or a fixed disc drive, which may be local or remote in some embodiments. Memory 1003 may include read only memory, random access memory, etc. Applications resident on the computing device may be stored on or accessed via a computer readable medium such as memory 1003 or mass storage device 1007 in some embodiments. Applications may also be in the form of modulated electronic signals modulated accessed via a network modem or other network interface of the computing device. It should be appreciated that CPU 1001 may be embodied in a general-purpose processor, a special purpose processor, or a specially programmed logic device in some embodiments.

Display 1011 is in communication with CPU 1001, memory 1003, and mass storage device 1007, through bus 1005. Display 1011 is configured to display any visualization tools or reports associated with the system described herein. Input/output device 1009 is coupled to bus 1005 in order to communicate information in command selections to CPU 1001. It should be appreciated that data to and from external devices may be communicated through the input/output device 1009. CPU 1001 can be defined to execute the functionality described herein to enable the functionality described with reference to FIGS. 1-9. The code embodying this functionality may be stored within memory 1003 or mass storage device 1007 for execution by a processor such as CPU 1001 in some embodiments. The operating system on the computing device may be iOS™, MS-WINDOWS™, OS/2™, UNIX™, LINUX™, or other known operating systems. It should be appreciated that the embodiments described herein may also be integrated with a virtualized computing system implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for identifying a printer and printing, comprising:
    transmitting, from each of a plurality of printers, a wireless beacon;
    as part of a registration process for a printer-service, receiving, in turn, at each respective printer in said plurality of printers, a request from a computing device for printer identification information (printer ID) uniquely identifying the respective printer, after the respective printer transmits the requested printer ID to the computing device, the respective printer receiving from the computing device printer-service registration information that assigns, to the respective printer, device location information of the computing device irrespective of a location of the respective printer;
    after completion of the registration process, receiving, at a target printer selected from among said plurality of printers, an instruction from a mobile device to print information, wherein the instruction is received via a network, the mobile device selecting, based on radio signal strength of wireless beacons, which of the plurality of printers is closest to the mobile device and selecting and coupling to the closest printer as the target printer via the network to send the instruction to the target printer; and
    printing, at the target printer selected by the mobile device, the information in accordance with the instruction;
    wherein in response to the mobile device responding to the wireless beacon of the target printer, the target printer selectively transmitting to the mobile device marketing information localized to the assigned device location information of the target printer.

2. The method of claim 1, wherein:
    the transmitting includes transmitting, in the wireless beacon, a network identity of the printer; and
    the receiving is based on the mobile device sending the information to the printer via the network, using the network identity of the printer.

3. The method of claim 1, wherein:
    the information is included in a sales transaction receipt generated by the mobile device such that the target printer, which is closest to the mobile device, is automatically selected and the sales transaction receipt is automatically printed at the target printer that is closest to the mobile device; and
    the mobile device indicates which of the plurality of printers is the target printer to which the instruction to print the information is sent.

4. The method of claim 1, wherein the mobile device determines, selects and couples to the target printer without manual selection of the target printer.

5. The method of claim 1, wherein the mobile device indicates when the mobile device is closer to or farther away from the target printer, based on the radio signal strength.

6. The method of claim 1, wherein the network coupling the target printer and the mobile device is direct wireless coupling omitting a wireless router.

7. A tangible, non-transitory, computer-readable media package having instructions thereupon which, when executed by at least one processor, cause the at least one processor to perform the method of claim 1.

8. The method of claim 1, wherein:
the computing device communicates wirelessly with the respective printer using direct wireless communication omitting a router; and
the mobile device communicates wirelessly with the target printer using wireless network communication using a router.

9. The method of claim 8, wherein:
the direct wireless communication uses first communication protocol; and
the wireless network communication using a router uses a second communication protocol incompatible with the first network protocol.

10. The method of claim 8, wherein the direct wireless communication uses a Bluetooth communication protocol and the wireless network communication using a router uses an Internet standard network protocol.

11. The method of claim 1, wherein the device location information of the computing device is determined using a Global Positioning System (GPS) receiver of the computing device.

12. The method of claim 1, wherein:
the computing device is part of a point-of-sale (POS) system; and
the mobile device is a customer device different from the computing device, and is not part of the POS system.

13. A system with printer location aware detection and printing, comprising:
a printer having wireless connectivity and a wireless beacon;
as part of a registration process for a printer-service, the printer receiving a request from a computing device for printer identification information (printer ID) uniquely identifying the printer, after the printer transmits the requested printer ID to the computing device, the printer receiving from the computing device printer-service registration information that assigns, to the printer, device location information of the computing device irrespective of a location of the printer;
the printer configured to couple, after completion of the registration process, using the wireless connectivity, to a mobile device responsive to the mobile device determining, based on radio signal strength of wireless beacons, that the printer is a closest printer, of a plurality of printers, to the mobile device; and
the printer configured to receive, via the wireless connectivity, from the mobile device, information to print, and print the information;
wherein in response to the mobile device responding to the wireless beacon of the printer, the printer selectively transmits to the mobile device marketing information localized to the assigned device location information of the printer.

14. The system of claim 13, wherein:
the wireless beacon transmits a network identity of the printer; and
the mobile device couples to the printer and sends the information to print, to the printer, using the wireless connectivity and the network identity of the printer.

15. The system of claim 13, further comprising:
the mobile device, configured to generate a sales transaction receipt that is included in the information, wherein the sales transaction receipt is automatically printed at the closest printer as a result of the printer configuration and cooperation with the mobile device.

16. The system of claim 13, further comprising:
the mobile device, configured to determine, based on the radio signal strength of the wireless beacons, which printer of the plurality of printers is the closest printer to the mobile device;
the mobile device configured to select the closest printer, without manual selection; and
the mobile device configured to send a sales transaction receipt to the printer, the sales transaction receipt being included in the information.

17. The system of claim 13, further comprising:
the mobile device, having a visual indication that the mobile device is getting closer to or farther away from the printer, responsive to the mobile device selecting the printer as the closest printer and sending the information for printing to the printer.

18. The system of claim 13, wherein:
the computing device communicates wirelessly with the printer using direct wireless communication omitting a router; and
the mobile device communicates wirelessly with the printer using wireless network communication using a router.

19. The system of claim 13, wherein the device location information of the computing device is determined using a Global Positioning System (GPS) receiver of the computing device.

20. The system of claim 13, wherein:
the computing device is part of a point-of-sale (POS) system; and
the mobile device is a customer device different from the computing device, and is not part of the POS system.

* * * * *